Apr. 3, 1923.  1,450,738
F. M. CASE
TENSION OIL CAP FOR FISHING REELS
Filed Nov. 19, 1921
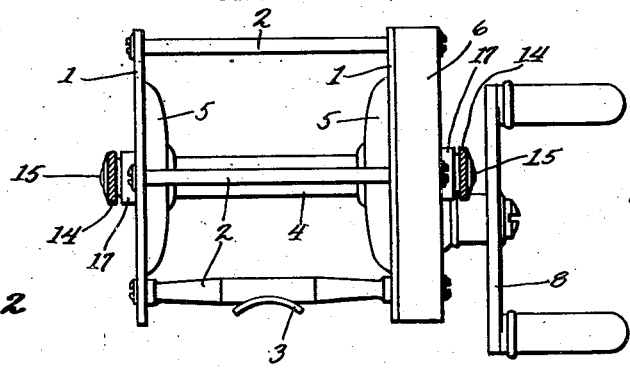
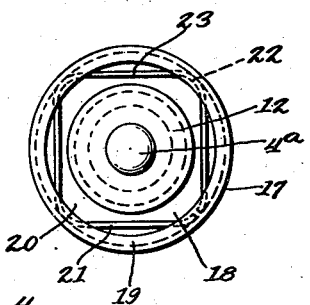
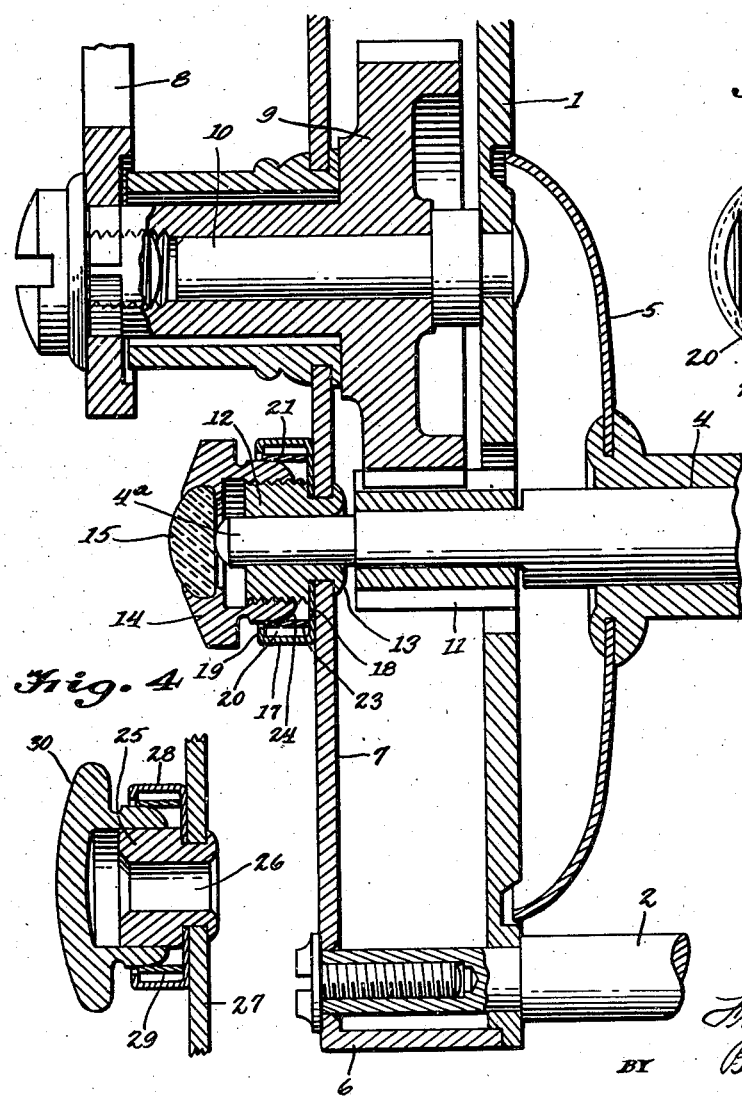
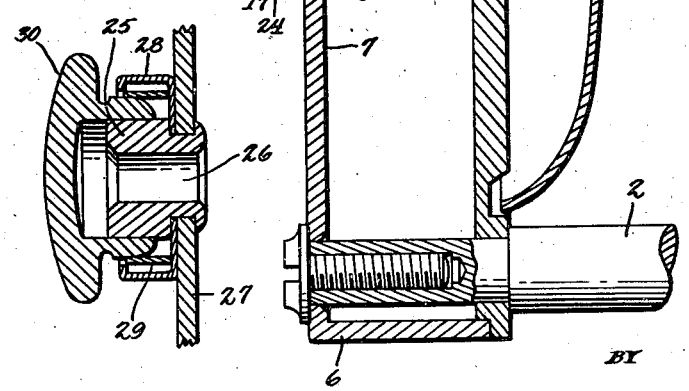
INVENTOR
Francis M. Case
BY Brockett & Hyde
ATTYS Patented Apr. 3, 1923.

1,450,738

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

TENSION OIL CAP FOR FISHING REELS.

Application filed November 19, 1921. Serial No. 516,406.

*To all whom it may concern:*

Be it known that I, FRANCIS M. CASE, a citizen of the United States, residing at Cleveland, in the county of Cuyahoga and State of Ohio, have invented certain new and useful Improvements in Tension Oil Caps for Fishing Reels, of which the following is a specification.

This invention relates to tension oil caps such as are used for the rotating spool of a fishing reel or in other places.

The object of the invention is to provide an improved tension oil cap which is of simple construction; which can be readily attached to a fishing reel or embodied in other constructions; which enables the rotating part, such as the spool shaft, to be readily lubricated; which enables the end bearing to be easily adjusted; which will retain the parts in any position to which they may be adjusted and in which the adjustable parts are not likely to become lost.

Further objects of the invention are in part obvious and in part will appear more in detail hereinafter.

The invention comprises the construction and arrangement of parts hereinafter described and claimed.

In the drawings Fig. 1 is a front elevation of a fishing reel embodying the invention; Fig. 2 is a detail longitudinal sectional view on a larger scale, illustrating the tension oil cap and the driving mechanism for the spool; Fig. 3 is a detail end view from the left in Fig. 2, the threaded cap being omitted; and Fig. 4 is a detail section showing another form of the invention.

The invention may be used in many places, the drawings showing it applied to a well known form of fishing reel embodying a frame comprising end plates 1 connected by pillars 2, two of which have attached thereto a curved plate 3 for attachment to the fishing rod. The rotating spool includes the shaft 4 having end heads 5, the drive gearing for said spool being enclosed in a chamber at one end of the reel formed by an end plate 1 and a cap or casing 6, the outer wall 7 of which has openings through which the shafts extend. 8 represents the operating handle which drives a gear 9 on a shaft 10 which is carried by one of the end plates 1, said gear meshing with and driving a smaller pinion 11 rotatable with the spool shaft 4, which shaft extends through the end plate 1 and the casing wall 7 where its reduced end 4ª is journalled in a threaded boss 12 carried by said wall 7. This boss may be a part of the wall but is shown as attached thereto by having a reduced portion extending through said wall and beaded on its inner face as at 13. Said boss is externally threaded to receive the internally threaded skirt of a cap 14 carrying a suitable end bearing, such as an agate or other hardened piece 15 with which the rounded outer end of the spool shaft engages. By unscrewing the cap 14 lubricant may be applied to the shaft 4ª for lubricating the bearing surfaces in the boss 12 and for also lubricating the end bearing.

Surrounding the reduced skirt of the cap is a hollow annular cup shaped sheet metal member 17 having one wall 18 firmly clamped between a shoulder on the boss 12 and the wall 7, while the outer portion of said member 17 has an inturned flange 19 which confines in the cavity 20 within said member a resilient bent sheet metal spring 21. Said metal spring is bent into suitable non-circular, such as rectangular form as shown in Fig. 3 so that the rounded bent corners thereof, marked 22, are confined beneath the flange 19, while the several straight portions 23 thereof extend inwardly from the flange 19. The ends of the spring do not quite meet. The outer portion of the inner end of the cap skirt is also rounded off or tapered slightly as at 24.

With the foregoing arrangement the internally threaded cap 14 may be readily rotated to take up end play and adjust the bearing. When screwed into proper adjusted position, as in Fig. 2, its skirt is surrounded by the cup shaped member 17 so that dirt and dust are not likely to work their way into the bearing. At the same time the threaded cap may be easily unscrewed so that the bearing may be lubricated. Assuming the cap to be fully unscrewed, when said cap is restored to position and is screwed in, its inner end engages the straight portions 23 of the resilient spring and forces the same outwardly, thereby placing them under tension. Each of the four parts of the spring is therefore bowed outwardly and exerts frictional resistance to turning movement of the cap so that the cap is frictionally held in any position to which it may be adjusted and is not likely to work loose. Similar caps, may of course, be used at both ends of the spool and are so shown in the drawings.

Fig. 4 shows another arrangement capable of more general use in which the hollow boss 25 surrounds an opening 26 in a plate 27, said opening leading to any part to be lubricated or inspected. Said boss has a plain outer surface and is surrounded by the cup shaped member 28 enclosing the spring 29, members 28, 29 being like members 17, 21 before described. The cap 30 in this case is merely pushed endwise into place and is frictionally held by the spring.

What I claim is:

1. In a device of the character described, a hollow boss, a cup shaped member surrounding and spaced from said boss, a removable cap having a skirt surrounding said boss and entering said member, and a bent metal spring strip within said member for frictionally engaging the skirt of said cap.

2. A fishing reel having an end plate, a rotating shaft extending through said plate, a hollow bearing member for said shaft, a cap movable on said member, a bent metal spring strip surrounding said cap for exerting yielding pressure thereon, and bearing means for said spring strip.

3. A fishing reel having an end plate, a rotating shaft extending through said plate, a hollow bearing member for said shaft, a cap movable on said member and removable therefrom, and a bent metal spring strip surrounding said cap for exerting yielding pressure thereon, the end of said cap being slightly tapered to wedge into said spring.

4. A fishing reel having an end plate, a rotating shaft extending through said plate, a hollow bearing member for said shaft, a cap movable on said member, a bent metal spring strip surrounding said cap for exerting yielding pressure thereon, the end of said cap being slightly tapered to wedge into said spring, and a cup shaped member surrounding and enclosing said spring.

5. A fishing reel having an end plate, a rotating shaft extending through said plate, a hollow bearing member for said shaft, a cap movable on said member, a spring strip surrounding said cap, and an annular member surrounding said spring, said spring strip having bearing portions adapted to engage said annular member and spring portions adapted to engage said cap.

6. A fishing reel having an end plate, a rotating shaft extending through said plate, a hollow bearing member for said shaft, a cap movable on said member, a bent metal spring strip surrounding said cap for exerting yielding pressure thereon, the end of said cap being slightly tapered to wedge into said spring, and an annular member occupying fixed position with respect to said bushing and having an overhanging portion affording a retaining means for said spring.

7. A fishing reel having an end plate, a rotating shaft extending through said plate, a hollow bearing member for said shaft, a cap movable on said member, a bent metal spring strip surrounding said cap for exerting yielding pressure thereon, the end of said cap being slightly tapered to wedge into said spring, and an annular member having a flange secured between said bearing and end plate and being provided with an overhanging portion affording a housing and retaining means for said spring.

8. A fishing reel having an end plate, a rotating shaft extending through said plate, a hollow bearing member for said shaft, a cap movable on said member, an angularly bent metal spring strip surrounding said cap for exerting yielding pressure thereon, the end of said cap being slightly tapered to wedge into said spring, and a substantially annular member occupying fixed position with respect to said bushing and affording bearing means for the angular portions of said spring, whereby the spring portions intermediate said angular portions are adapted to exert pressure upon said cap.

In testimony whereof I hereby affix my signature.

FRANCIS M. CASE.